(12) United States Patent
Da Fonseca et al.

(10) Patent No.: US 10,575,043 B2
(45) Date of Patent: Feb. 25, 2020

(54) NAVIGATING A PLURALITY OF VIDEO CONTENT ITEMS

(71) Applicant: Orange, Paris (FR)

(72) Inventors: Caroline Da Fonseca, Amsterdam (NL); Christophe Rufin, Boulogne-Billancourt (FR); Yann Ruello, Le Plessis Robinson (FR)

(73) Assignee: ORANGE, Paris (FR)

( * ) Notice: Subject to any disclaimer, the term of this patent is extended or adjusted under 35 U.S.C. 154(b) by 65 days.

(21) Appl. No.: 15/608,372

(22) Filed: May 30, 2017

(65) Prior Publication Data

US 2017/0347144 A1 Nov. 30, 2017

(30) Foreign Application Priority Data

May 27, 2016 (FR) ...................................... 16 54819

(51) Int. Cl.
| | |
|---|---|
| G06F 3/0482 | (2013.01) |
| H04N 21/431 | (2011.01) |
| H04N 21/472 | (2011.01) |
| H04N 21/482 | (2011.01) |
| G06F 3/0484 | (2013.01) |
| G11B 27/19 | (2006.01) |

(52) U.S. Cl.
CPC ......... *H04N 21/431* (2013.01); *G06F 3/0482* (2013.01); *G06F 3/04847* (2013.01); *G11B 27/19* (2013.01); *H04N 21/4312* (2013.01); *H04N 21/4314* (2013.01); *H04N 21/4316* (2013.01); *H04N 21/47202* (2013.01); *H04N 21/47217* (2013.01); *H04N 21/482* (2013.01)

(58) Field of Classification Search
CPC .............................. G06F 3/0482; G06F 3/0484
See application file for complete search history.

(56) References Cited

U.S. PATENT DOCUMENTS 9,858,968 B2 * 1/2018 Hwang ................. G06F 3/0485
9,953,680 B2 * 4/2018 Kim ..................... G11B 27/031
(Continued)

OTHER PUBLICATIONS

What Is a YouTube End Card—Feb. 10, 2016.*
(Continued)

*Primary Examiner* — David E Choi
(74) *Attorney, Agent, or Firm* — David D. Brush; Westman, Champlin & Koehler, P.A.

(57) ABSTRACT

A method for processing a plurality of video content items for a graphical user interface to render at least two content items among the plurality, the video content items of the plurality being successively rendered. The method includes: rendering a first content item among the plurality, on a full screen; at a first predetermined period of time before the end of rendering the first video content item, displaying a progress bar having a plurality of images, each image respectively corresponding to a video content item among the plurality of video content items; rendering a second video content item; applying a graphic effect to an image of the bar corresponding to the second content item; eliminating the display of the progress bar after a second predetermined period of time after the rendering of the second content item begins, such that the second content item is rendered on the full screen.

15 Claims, 3 Drawing Sheets

(56) References Cited

U.S. PATENT DOCUMENTS

| | | | | |
|---|---|---|---|---|
| 2013/0227414 A1* | 8/2013 | Hwang | ................ | G06F 3/0485 |
| | | | | 715/719 |
| 2013/0262575 A1* | 10/2013 | Xiong | ................ | H04N 21/254 |
| | | | | 709/204 |
| 2013/0324192 A1* | 12/2013 | Lee | .................... | H04M 1/0266 |
| | | | | 455/557 |
| 2015/0181270 A1 | 6/2015 | van Coppenolle et al. | | |
| 2016/0034574 A1* | 2/2016 | Kang | .................. | G06F 3/0482 |
| | | | | 715/720 |
| 2017/0134605 A1* | 5/2017 | Ju | ....................... | H04N 1/2125 |
| 2017/0347144 A1* | 11/2017 | Da Fonseca | .......... | G06F 3/0482 |

OTHER PUBLICATIONS

French Search Report dated Mar. 3, 2017 for corresponding French Application No. 1654819, filed May 27, 2016.
English translation of the French Written Opinion dated Mar. 3, 2017 for corresponding French Application No. 1654819, filed May 27, 2016.

* cited by examiner

NAVIGATING A PLURALITY OF VIDEO CONTENT ITEMS

CROSS-REFERENCE TO RELATED APPLICATIONS

This Application claims priority to and the benefit of French Patent Application No. FR 16/54819, filed May 27, 2016, the content of which is incorporated herein by reference in its entirety.

FIELD OF THE DISCLOSURE

The present invention lies within the field of navigating a plurality of video content items. It relates in particular to a method for monitoring progress when rendering the plurality of content items.

This method is particularly advantageous for enabling a user to monitor progress in a succession of video content items on a graphical user interface, the succession of video content items having been personalized by or for the user.

BACKGROUND OF THE DISCLOSURE

"Video content item" is understood to mean any type of content capable of yielding moving images forming a video, whether or not accompanied by sound. An example of a video content item is an avi or mpeg file. In the remainder of the description, the terms "video content", "content", and "video" will be used interchangeably.

"Rendering a video content item" is understood to mean any processing of a video content item such that at least one piece of information contained in the content item can be transmitted to the user. Examples of rendering a video content item include the playback of at least a portion of the images or soundtrack included in the video content item, via a screen, speakers, or a holographic or three-dimensional device.

"Navigating a plurality of video content items" is understood to mean the possibility for a user to monitor progress or browse through different moments in the plurality of video content items, for example by launching a video among the plurality of videos or by viewing an image or a progress bar corresponding to the advancement of the rendering of the plurality of video content items.

"Graphical user interface" (GUI) is understood to mean any device for human-machine dialogue in which the objects to be manipulated are drawn in the form of icons on the screen, enabling the user to imitate a physical manipulation of these objects by means of a pointing device (remote control, fingers, stylus, or mouse for example). In particular, the graphical user interface may include a display of various components such as a primary video content playback area and a progress bar, with certain components or component portions being selectable by the user.

The proliferation of sources of video content, for example websites hosting video content such as Dailymotion™ or YouTube™, social networks, or even email, makes it complex to manage graphical user interfaces configured for rendering such content.

In particular, each source requires executing a respective application for rendering the content extracted from the source, by means of a graphical user interface comprised in the application. In the example of rendering video content on a television by means of a set-top box, content extracted from the YouTube™ platform is rendered by a dedicated application, content extracted from an email is rendered by a dedicated application, etc.

The successive or simultaneous execution of these applications has many disadvantages. In particular, the hardware resources required by these applications are significant. The processing capacities (use of the processor or RAM) or the battery of the system on which the applications are executed are strongly impacted. Furthermore, the cost of the bandwidth consumed by the system is more difficult to justify when multiple applications of heterogeneous design are used.

In order to solve these problems and facilitate user viewing of video content, it has been proposed to collect the various video content items and to render them by means of a single graphical user interface, or at least by a single application. To do this, it is possible for example to successively render various video content items from different sources, by means of a single graphical user interface.

The aggregation of various video content items into a plurality of video content items to be successively rendered makes it difficult for a user to monitor progress in the rendering of content. Typically the user may wish to know his or her current location in the rendering of the plurality of content items. To do so, it is frequently necessary for the user to call upon the graphical user interface to find out where he or she is in the rendering of the plurality of content items.

These manipulations limit the advantages, in terms of usage of hardware resources, of aggregating the video content items into a plurality of content items rendered by a single interface. Interactions with the user interface are costly in terms of electrical energy and also may make unnecessary demands on the processor.

There is therefore a need to streamline the rendering of a plurality of video content items via a graphical user interface.

SUMMARY

An exemplary embodiment of the present invention improves the situation.

To this end, a first aspect of the invention relates to a method for processing a plurality of video content items in order for a graphical user interface to render at least two content items among the plurality, the video content items of the plurality being successively rendered, the method comprising the steps of:
rendering a first video content item among said plurality, on a full screen;
at a first predetermined period of time before the end of rendering said first video content item, displaying a progress bar comprising a plurality of images, each image respectively corresponding to a video content item among the plurality of video content items;
rendering a second video content item;
applying a graphic effect to an image of the bar corresponding to the second video content item;
eliminating the display of the progress bar after a second predetermined period of time after the rendering of the second content item begins, such that the second content item is rendered on the full screen.

The expression "applying a graphic effect to an image of the bar" is understood to mean any action configured to emphasize the image concerned among the plurality of images of the bar. Examples of graphic effects include framing the image with a border of different thickness and/or color, changing the image size, and highlighting the image.

The steps of displaying and applying the graphic effect have the effect of informing the user of where he or she is in the succession of the plurality of content items. For example, if five videos are comprised in the plurality of video content items, the user will be informed of the change from the third to the fourth video by the display of the progress bar and the graphic effect. It is therefore no longer necessary for the user to constantly query the graphical user interface to find out where he or she is in the plurality of content items, which reduces use of the battery and processor.

Furthermore, the automated display then elimination of the bar informs the user without interfering with the playback of the plurality of content items. The user therefore does not need to interact with the graphical user interface, which further reduces the use of electrical power and computing resources.

Note that the order of the steps of the method according to the invention is not necessarily the one given above. In particular, the step of applying the graphic effect and the step of rendering the second video content item may be reversed or carried out simultaneously. When these steps are carried out simultaneously, the user more easily identifies where he or she is in the advancement within the plurality of content items.

In one embodiment, when the bar is displayed, the graphical user interface comprises the full-screen rendering of the first and then second video content items and the display of the bar as an overlay. The video therefore does not move; only the bar is added to the video being played on the full screen. There is no change of scale to the images forming the video (as would be the case if the entirety of the images was displayed but the image positions were modified to leave screen space for the bar). The user is therefore even less bothered by the appearance of the bar.

In another embodiment, when the bar is displayed, the graphical user interface includes a main playback area configured for rendering the first and then the second video content items, and includes the progress bar. In this situation, there is indeed a scaling of the images forming the video when changing from full-screen rendering to rendering with a bar. This means the user does not lose a portion of the images forming the video (because the bar obstructs a portion of the images forming the video if it is simply an overlay).

In one embodiment, the bar comprises an image corresponding to the first video content item. In this embodiment, at least the image corresponding to the first video content item is a moving image, such that the rendering of the first video content item and the movement of the image corresponding to the first content item are synchronized.

In another embodiment, at least the image corresponding to the second video content item is a moving image, such that the rendering of the second video content item and the movement of the image corresponding to the second content item are synchronized.

The correspondence between the moving images of the bar and the rendered content further facilitates tracking progress within the plurality of content items by the user. He or she can directly identify in the bar what is being rendered for example in the main playback area.

In one embodiment, at least the second video content item comprises metadata, so that the step of applying the graphic effect further comprises displaying at least a portion of said metadata. In particular, the metadata may be displayed in an area separate from the bar display area. Interactions with the graphical user interface, and therefore the drain on the battery and processor, are further reduced. Indeed, presenting the metadata to the user eliminates the need to manipulate the graphical user interface in order to obtain the information included in the metadata.

In one embodiment, the succession of video content items comprised in the plurality of video content items is determined by at least one element among: a history of video content items viewed by the user of the graphical user interface, video content items shared on a social network by friends in the social network of the user of the graphical user interface, preferences of the user of the graphical user interface. The relevance of the videos included in the plurality of content items is therefore improved.

In another embodiment, the metadata comprise at least one piece of information concerning said at least one element. The user can therefore find out the source of the videos he or she accesses.

In one embodiment, the images of the bar extend in a direction parallel to the bar. Comprehension of the succession of videos among the plurality of video items is thus facilitated.

A second aspect of the invention relates to a computer program comprising instructions for implementing the method according to the first aspect of the invention when these instructions are executed by a processor.

A third aspect of the invention relates to a device for processing a plurality of video content items in order for a graphical user interface to render at least two content items among the plurality, the video content items among the plurality being successively rendered, the device comprising:
    a screen configured to display the graphical user interface;
    a processor configured to perform the operations of:
        rendering of a first video content item among said plurality, on a full screen;
        at a first predetermined period of time before the end of rendering said first video content item, displaying a progress bar comprising a plurality of images, each image respectively corresponding to a video content item among the plurality of video content items;
        rendering a second video content item;
        applying a graphic effect to an image of the bar corresponding to the second video content item;
        eliminating the display of the progress bar after a second predetermined period of time after the rendering of the second content item begins, such that the second content item is rendered on the full screen.

BRIEF DESCRIPTION OF THE DRAWINGS

Other features and advantages of the invention will be apparent from the following detailed description and the accompanying drawings, in which.

DETAILED DESCRIPTION OF ILLUSTRATIVE EMBODIMENTS

The invention is described below in its non-limiting application to a television screen receiving data from a set-top box where the set-top box receives instructions from a user, for example by means of a remote control. It is also possible for the television to integrate the functionalities implemented by the set-top box. Other applications, such as a smartphone controlled by the user by means of a touch screen, a stylus-controlled tablet, or a motion-controlled gaming console, are also possible.

The term "touch screen" is understood to mean any type of screen capable of being controlled by a user motion, this definition including control of a screen by analyzing movements made in direct proximity, or more distant proximity, to the screen. Near Field Imaging (NFI) and visual detection of motion (such as the Kinect™ device) are examples of touch screens.

Figure 1:
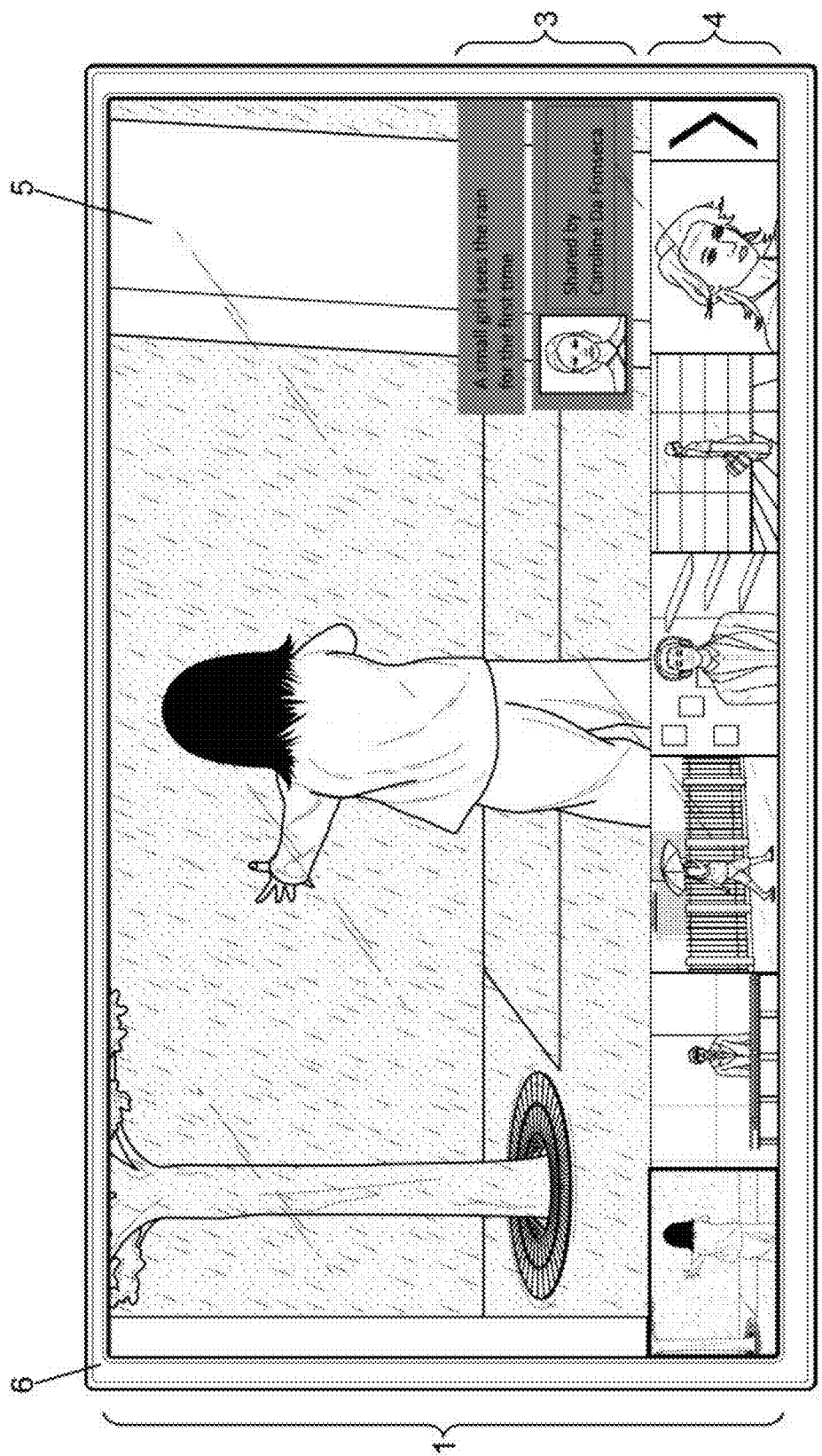
FIG. 1 illustrates a context of use of the invention, according to one embodiment.
Figure 3:
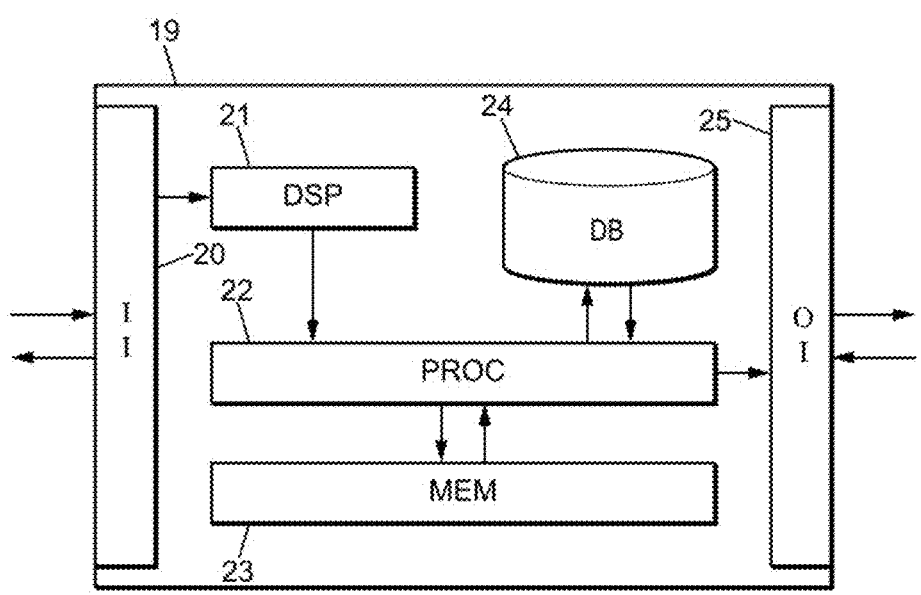
FIG. 3 illustrates a microcontroller according to an embodiment of the invention.

FIG. 1 represents a context for implementing the invention. In particular, a television screen 6, typically receiving data from a set-top box comprising a microcontroller described below with reference to FIG. 3, is configured to display a graphical user interface 1.

The graphical user interface 1 comprises:
  a main playback area 5 configured for rendering video content;
  a progress bar 4; and
  a metadata display area 3.

In FIG. 1, the image (little girl in the rain) of the rendered video content is represented in full screen, with the bar 4 and area 3 overlaid on the full-screen image. In this situation, area 5 corresponds to the image (little girl in the rain) of the video content, the lower part cut off as it is obstructed by the bar 4 and the portion reserved for displaying metadata.

In another embodiment, the image (little girl in the rain) from the video content item is scaled so that area 5 renders the entire image from the video content. Typically, the size of the image may be reduced and the image shifted so that it is centered in area 5. Other combinations for displaying the graphical user interface are also possible (metadata overlay but scaling so that the bar does not obstruct the bottom of the image).

The bar 4 comprises a plurality of images, each image respectively corresponding to a video content item among a plurality of video content items. The images of the bar extend in a direction parallel to the bar. The images of the bar may, from left to right, correspond to the succession of videos among the plurality of video items. In a region of the world in which it is common to represent a chronological succession from right to left, the images of the bar may correspond, from right to left, to the succession of videos among the plurality of video items.

For example, in FIG. 1, images depicting a little girl in the rain, a television show, a person walking in the rain, a clip of one actor, a smiling girl, and a mysterious actress are included in the bar. The plurality of videos comprises the videos corresponding to these images. The videos are successively rendered, in particular in area 5, for example in the order of the images of the bar 4. Thus, if rendering all videos among the plurality of video items, a video of a little girl in the rain, a television show, a person walking in the rain, etc. will be successively rendered.

All videos among the plurality of video items may be represented in the bar 4. Alternatively, in particular when there is a large number of videos in the plurality of video items, only a few videos are represented by an image in the bar 4. In this situation, the images of the bar may represent at least one video preceding and/or following the rendered video (little girl in the rain). To browse other images corresponding to other videos, the user can interact with the graphical user interface to display these other images in the bar, for example by selecting the arrow to the right of the bar 4 in FIG. 1 or in references 8 and 9 of FIG. 2.

In one embodiment, the succession of video content items comprised in the plurality of video content items is determined by at least one among:
  a history of video content items accessed by the user of the graphical user interface. This history may also be exported from other applications or interfaces. For example, this history may correspond to videos viewed on the YouTube™ platform;
  video content items shared on a social network by friends in the social network of the user of the graphical user interface. These content items may also be content items shared by the user on the social network. The social network is for example Facebook™, Twitter™, or Instagram™;
  preferences of the user of the graphical user interface. The user can thus indicate preferences for animal videos, videos shorter than 30 seconds, black-and-white videos, or videos shown on a particular television channel.

The selection of content items among the plurality of video items may be made by considering one of the aforementioned elements or a combination of these elements. For example, a video may be chosen based on the observation that the user frequently watches videos shared on Facebook™ by Caroline Da Fonseca. Thus, the video of the little girl in the rain shared on Facebook™ by Caroline Da Fonseca could be selected based on these criteria.

The selection may also be made directly by the user, who selects videos so that they are included in the plurality of video items.

The metadata displayed in area 3 may include information about the element that led to selecting the video. For example, information about the contact on Facebook™ who shared the video about the little girl may be listed in area 3.

Figure 2:
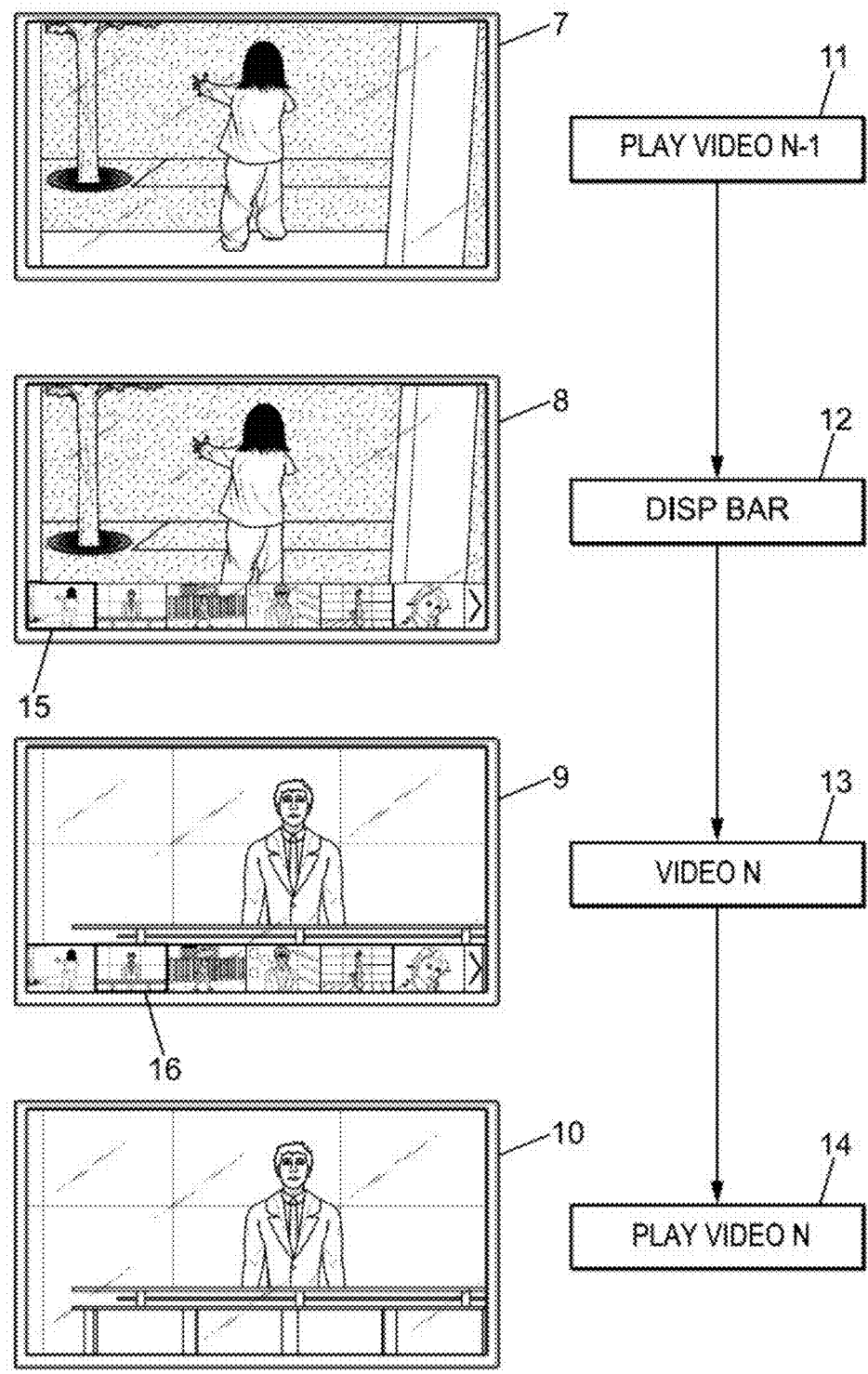
FIG. 2 is a diagram illustrating the steps of a method according to an embodiment of the invention.

FIG. 2 illustrates the steps of the method according to the invention, in one embodiment. In particular, the following steps are represented:
  in step 11, full-screen rendering of a first video content item (little girl in the rain) among the plurality of video items;
  in step 12, the bar 4 is displayed at a first predetermined period of time before the end of rendering of the first video item;
  in step 13, the second video content item is rendered, and a graphic effect 16 is applied to an image of the bar corresponding to a second video content item, the second content item following the first content item;
  in step 14, display of the bar 4 is eliminated after a second predetermined period of time after the rendering of the second content item begins, such that the second content item is rendered on the full screen.

The display of the graphical user interface 1 is illustrated in references 7, 8, 9, and 10. References 7, 8, 9, and 10 respectively correspond to steps 11, 12, 13 and 14.

In step 12, in one embodiment, a graphic effect 15 is also applied to the image in the bar corresponding to the first video content (little girl in the rain). The graphic effect may correspond to a simple frame around the image, as illustrated in FIG. 2. Other effects may also be considered, such as framing the image with a border of different thicknesses and/or changing the image size, highlighting the image, and so on.

When the bar 4 is displayed, the graphical user interface 1 may comprise the rendering of the first then the second video content items in the main playback area 5. The main playback area may comprise the complete images of the rendered video, or only a portion of these images (cropped images, see also the above explanations with reference to FIG. 1).

In one particular embodiment, the graphic effect is applied at a third predetermined period of time before, after, or simultaneous to beginning the rendering of a second video content item among the plurality of video content items.

The first, second, and/or third predetermined period of time may be chosen by the user, predefined, or variable depending on the video content. In one embodiment, the first, second, and/or third predetermined period of time is a few seconds, for example one second.

In one embodiment, at least one image contained in the bar 4 is a moving image. For example, the moving image may be the image corresponding to the video being rendered in the main playback area 5. Thus, in the example given in FIG. 2, denoted 8, the image comprised in the graphic effect 15 is a moving image, so that the rendering of the first video content (little girl in the rain) and the animation of the image comprised in the graphic effect 15 is synchronized. Similarly, in reference 9, the moving image comprised in the graphic effect 16 and the second video content item (television program) being rendered are synchronized.

The details of a microcontroller 19, comprised in the set-top box for example, by which the steps are implemented, the steps of the method described with reference to FIG. 2 in particular, is described here with reference to FIG. 3.

This microcontroller 19 may take the form of a housing comprising printed circuits, of any type of computer or of any type of sub-portion of the set-top box.

The microcontroller 19 comprises random access memory 23 for storing instructions for implementation by a processor 22 of the steps of the method described with reference to FIG. 2 in particular. The device also comprises mass storage 24 for storing data intended to be retained after implementation of the method.

The microcontroller 19 may further comprise a digital signal processor (DSP) 21. This DSP 21 for example receives the video in order to format, demodulate, and amplify this video in a manner that is known per se.

The microcontroller 19 also comprises an input interface 20 for receiving data such as the video, the input signals received from the user, operating parameters, and the like.

The microcontroller 19 also comprises an output interface 25 in particular for the transmission of display data intended for the screen.

The present invention is not limited to the embodiments described above by way of example; it extends to other variants.

The invention has thus been described above in its application to a television screen connected to a set-top box. The invention may also be implemented on a smartphone, a tablet, a laptop or desktop computer, or any other electronic device.

Although the present disclosure has been described with reference to one or more examples, workers skilled in the art will recognize that changes may be made in form and detail without departing from the scope of the disclosure and/or the appended claims.

What is claimed is:

1. A method for processing a plurality of video content items in order for a graphical user interface to render at least two content items among the plurality, the video content items of the plurality being successively rendered, the method comprising the acts of:

full-screen rendering on a main playback area of said graphical user interface of a first video content item among said plurality;

at a first predetermined period of time before the end of said full-screen rendering, displaying as an overlay to said first video content item, a progress bar comprising a plurality of images, each image respectively corresponding to a video content item among the plurality of video content items;

rendering on said main playback area of a second video content item among the plurality, said progress bar being overlaid on said second video content item;

applying a graphic effect to an image of the bar corresponding to the second video content item;

at a second predetermined period of time after said first predetermined period of time and after the rendering of the second content item begins, eliminating the display of the progress bar for full-screen rendering of the second content item; and a preliminary act of choosing a third predetermined period of time, said graphic effect being applied at said third predetermined period of time.

2. The method according to claim 1, wherein the acts of rendering the second video content and applying the graphic effect are carried out simultaneously.

3. The method according to claim 1, wherein:
the bar comprises an image corresponding to the first video content item; and
at least the image corresponding to the first video content item is a moving image, such that the rendering of the first video content item and the movement of the image corresponding to the first content item are synchronized.

4. The method according to claim 1, wherein at least the image corresponding to the second video content item is a moving image, such that the rendering of the second video content item and the movement of the image corresponding to the second content item are synchronized.

5. The method according to claim 1, wherein at least the second video content item comprises metadata, so that the act of applying the graphic effect further comprises displaying at least a portion of said metadata.

6. The method according to claim 5, wherein the metadata are displayed in an area separate from the bar display area.

7. The method according to claim 1, wherein the succession of video content items comprised in the plurality of video content items is determined by at least one element among:
a history of video content items accessed by the user of the graphical user interface;
video content items shared on a social network by friends in the social network of the user of the graphical user interface;
preferences of the user of the graphical user interface.

8. The method according to claim 6, wherein the metadata comprise at least one piece of information concerning said at least one element.

9. The method according to claim 1, wherein the images of the bar extend in a direction parallel to the bar.

10. A non-transitory computer-readable medium comprising a computer program stored thereon comprising instructions for implementing a method for processing a plurality of video content items, when these instructions are executed by a processor, wherein the instructions configure the processor to perform acts comprising:
processing the plurality of video content items in order for a graphical user interface to render at least two content items among the plurality, the video content items of the plurality being successively rendered, wherein processing comprises:

full-screen rendering on a main playback area of said graphical user interface of a first video content item among said plurality;

at a first predetermined period of time before the end of said full-screen rendering, displaying as an overlay to said first video content item a progress bar comprising a plurality of images, each image respectively corresponding to a video content item among the plurality of video content items;

rendering on said main playback of a second video content item among the plurality, said progress bar being overlaid on said second video content item;

applying a graphic effect to an image of the bar corresponding to the second video content item; and at a second predetermined period of time after said first predetermined period of time and after the rendering of the second content item begins, eliminating the display of the progress bar for full-screen rendering of the second content item.

11. A device for processing a plurality of video content items in order for a graphical user interface to render at least two content items among the plurality, the video content items among the plurality being successively rendered, the device comprising:

a screen configured to display the graphical user interface;

a processor configured to perform the operations of:

full-screen rendering of a first video content item among said plurality, on a main playback area of the graphical user interface;

at a first predetermined period of time before the end of said full-screen rendering, displaying as an overlay to said first video content item a progress bar comprising a plurality of images, each image respectively corresponding to a video content item among the plurality of video content items;

rendering on said main playback area of a second video content item;

applying a graphic effect to an image of the bar corresponding to the second video content item;

at a second predetermined period of time after said first predetermined period of time and after the rendering of the second content item begins, eliminating the display of the progress bar for full-screen rendering of the second content item; and the graphical user interface being configured for preliminary choosing a third predetermined period of time, said graphic effect being applied at said third predetermined period of time.

12. The method according to claim 1, further comprising:

selecting the plurality of video content items; and performing the acts of rendering the first and second video content items from the selected plurality of video content items.

13. The method according to claim 1, wherein the third predetermined period of time occurs before beginning the rendering of the second video content item.

14. The method according to claim 1, wherein the third predetermined period of time occurs after beginning the rendering of the second video content item.

15. The method according to claim 1, wherein the third predetermined period of time occurs simultaneous to beginning the rendering of the second video content item.

* * * * *